US012382061B2

(12) United States Patent
Afrabandpey et al.

(10) Patent No.: US 12,382,061 B2
(45) Date of Patent: Aug. 5, 2025

(54) PREDICTIVE AND RESIDUAL CODING OF SPARSE SIGNALS FOR WEIGHT UPDATE COMPRESSION

(71) Applicant: Nokia Technologies Oy, Espoo (FI)

(72) Inventors: Homayun Afrabandpey, Espoo (FI); Hamed Rezazadegan Tavakoli, Espoo (FI); Francesco Cricrì, Tampere (FI); Honglei Zhang, Tampere (FI); Goutham Rangu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 18/097,579

(22) Filed: Jan. 17, 2023

(65) Prior Publication Data
US 2023/0232015 A1 Jul. 20, 2023

Related U.S. Application Data

(60) Provisional application No. 63/300,149, filed on Jan. 17, 2022.

(51) Int. Cl.
*H04N 19/147* (2014.01)
*H04N 19/105* (2014.01)
*H04N 19/12* (2014.01)
*H04N 19/50* (2014.01)

(52) U.S. Cl.
CPC ......... *H04N 19/147* (2014.11); *H04N 19/105* (2014.11); *H04N 19/12* (2014.11); *H04N 19/50* (2014.11)

(58) Field of Classification Search
CPC .... H04N 19/105; H04N 19/12; H04N 19/147; H04N 19/50
See application file for complete search history.

(56) References Cited

U.S. PATENT DOCUMENTS

| | | | | |
|---|---|---|---|---|
| 11,032,546 B1* | 6/2021 | Krishnan | ............. | H04N 19/124 |
| 11,089,343 B2* | 8/2021 | Lu | ........................... | H04N 19/30 |
| 2006/0233254 A1* | 10/2006 | Lee | ........................ | H04N 19/61 |
| | | | | 375/240.03 |
| 2006/0262985 A1* | 11/2006 | Chen | ........................ | H04N 19/18 |
| | | | | 375/E7.199 |

(Continued)

OTHER PUBLICATIONS

C.-S. Park, S.-J. Baek, M.-S. Yoon, H.-K. Kim and S.-J. Ko, "Selective inter-layer residual prediction for SVC-based video streaming," in IEEE Transactions on Consumer Electronics, vol. 55, No. 1, pp. 235-239, Feb. 2009 (Year: 2009).*

(Continued)

*Primary Examiner* — Jeremiah C Hallenbeck-Huber
(74) *Attorney, Agent, or Firm* — Joseph C. Drish; McCarter & English, LLP

(57) ABSTRACT

An apparatus comprising: at least one processor; and at least one non-transitory memory storing instructions that, when executed by the at least one processor, cause the apparatus at least to: receive a signal, the signal comprising a sparse signal; perform residual coding on the signal; perform predictive coding on the signal; determine a residual, the residual comprising a residual of the signal and a base signal or a residual of an approximation and the base signal, the approximation being an approximation of the signal; and determine whether to transmit the residual or the signal over a communication channel.

22 Claims, 11 Drawing Sheets

(56) References Cited

U.S. PATENT DOCUMENTS

| | | | |
|---|---|---|---|
| 2009/0074070 A1* | 3/2009 | Yin | H04N 19/517 |
| | | | 375/E7.125 |
| 2013/0064300 A1* | 3/2013 | Jeon | H04N 19/30 |
| | | | 375/E7.123 |
| 2014/0286408 A1* | 9/2014 | Zhang | H04N 19/182 |
| | | | 375/240.12 |
| 2015/0350660 A1* | 12/2015 | Choi | H04N 19/423 |
| | | | 375/240.12 |
| 2016/0073126 A1* | 3/2016 | Zhang | H04N 19/30 |
| | | | 375/240.12 |
| 2021/0174197 A1* | 6/2021 | Georgis | H04L 65/75 |
| 2022/0132169 A1* | 4/2022 | Helmrich | H04N 19/13 |
| 2022/0156584 A1* | 5/2022 | Fersch | G10L 19/00 |
| 2023/0254533 A1* | 8/2023 | Le Scouarnec | |
| | | | H04N 21/440227 |
| | | | 725/86 |
| 2023/0300354 A1* | 9/2023 | Li | H04N 19/42 |
| | | | 375/240.03 |
| 2024/0195969 A1* | 6/2024 | Rezazadegan Tavakoli | |
| | | | H03M 7/3066 |

OTHER PUBLICATIONS

J.-L. Lin, Y.-W. Chen, Y.-P. Tsai, Y.-W. Huang and S. Lei, "Motion vector coding techniques for HEVC," 2011 IEEE 13th International Workshop on Multimedia Signal Processing, Hangzhou, China, 2011, pp. 1-6 (Year: 2011).*

Kai Yue et al. "Communication-Efficient Federated Learning via Predictive Coding" Aug. 2, 2021.

* cited by examiner

|  | Epoch 0 | | | Epoch 5 | | | Epoch 10 | | | Epoch 15 | | |
|---|---|---|---|---|---|---|---|---|---|---|---|---|
|  | Cummul. Bitstream Size | | Acc. | Cummul. Bitstream Size | | Acc. | Cummul. Bitstream Size | | Acc. | Cummul. Bitstream Size | | Acc. |
|  | RE With Switch | RE Withtot Switch | Anchor |  | RE With Switch | RE Withtot Switch | Anchor |  | RE With Switch | RE Withtot Switch | Anchor |  | RE With Switch | RE Withtot Switch | Anchor |  |
| Head-Only Bidirectional | 0.009 | 0.009 | 0.009 | 32.53 | 0.041 | 0.041 | 0.053 | 32.85 | 0.58 | 0.61 | 0.71 | 35.39 | 1.09 | 1.45 | 1.36 | 38.94 |
| Head-Only Unidirectional | 0.006 | 0.006 | 0.006 | 32.53 | 0.027 | 0.027 | 0.03 | 32.69 | 0.458 | 0.69 | 0.463 | 65.2 | 0.746 | 1.23 | 0.753 | 81.55 |
| Full-Model Unidirectional | 0.008 | 0.008 | 0.008 | 32.2 | 0.034 | 0.035 | 0.039 | 32.04 | 1.32 | 2.11 | 1.33 | 83.16 | 1.93 | 3.5 | 1.94 | 89.09 |

FIG. 6

PREDICTIVE AND RESIDUAL CODING OF SPARSE SIGNALS FOR WEIGHT UPDATE COMPRESSION

RELATED APPLICATION

This application claims priority to U.S. Provisional Application No. 63/300,149, filed Jan. 17, 2022, which is hereby incorporated by reference in its entirety.

STATEMENT OF GOVERNMENT SUPPORT

The project leading to this application has received funding from the ECSEL Joint Undertaking (JU) under grant agreement No 876019. The JU receives support from the European Union's Horizon 2020 research and innovation programme and Germany, Netherlands, Austria, Romania, France, Sweden, Cyprus, Greece, Lithuania, Portugal, Italy, Finland, Turkey.

TECHNICAL FIELD

The examples and non-limiting embodiments relate generally to multimedia transport and machine learning and, more particularly, to predictive and residual coding of sparse signals for weight update compression.

BACKGROUND

It is known to perform data compression and decoding in a multimedia system.

SUMMARY

In accordance with an aspect, an apparatus includes: at least one processor; and at least one non-transitory memory storing instructions that, when executed by the at least one processor, cause the apparatus at least to: receive a signal, the signal comprising a sparse signal; perform residual coding on the signal; perform predictive coding on the signal; determine a residual, the residual comprising a residual of the signal and a base signal or a residual of an approximation and the base signal, the approximation being an approximation of the signal; and determine whether to transmit the residual or the signal over a communication channel.

In accordance with an aspect, an apparatus includes: at least one processor; and at least one non-transitory memory storing instructions that, when executed by the at least one processor, cause the apparatus at least to: receive a signal, the signal comprising a sparse signal; determine a residual, the residual comprising a residual of the signal and a base signal or a residual of an approximation and the base signal, the approximation being an approximation of the signal; determine a first signal value based on a signal fitness of the signal, or a rate distortion analysis of the residual and the signal; determine a second signal value based on a signal fitness of the residual, or the rate distortion analysis of the residual and the signal; compare the first signal value to the second signal value; and determine whether to transmit the signal or the residual over a communication channel, based on the comparison of the first signal value to the second signal value.

In accordance with an aspect, an apparatus includes: at least one processor; and at least one non-transitory memory storing instructions that, when executed by the at least one processor, cause the apparatus at least to: receive a signal of data to be coded, the signal comprising a sparse signal; determine, during a predictive coding of the signal, an approximation of the signal from a set of observed signals or previously estimated signals; determine, during the predictive coding of the signal, a series of coefficients; determine whether to transmit the signal over a communication channel, to transmit the approximation over the communication channel, or to transmit the series of coefficients over the communication channel; and in response to determining to transmit the approximation over the communication channel, transmit also the coefficients over the communication channel.

In accordance with an aspect, an apparatus includes: at least one processor; and at least one non-transitory memory storing instructions that, when executed by the at least one processor, cause the apparatus at least to: receive, over a communication channel, a residual, a signal, an approximation of the signal, or a series of coefficients obtained from a predictive coding of the signal; wherein the residual comprises a residual of the signal and a base signal or a residual of an approximation and the base signal, the approximation being an approximation of the signal; wherein the signal comprises a sparse signal; in response to receiving the residual, reconstruct the signal from the base signal; in response to receiving the approximation of the signal, reconstruct the signal from the approximation of the signal; and in response to receiving the series of coefficients, reconstruct the signal from the series of coefficients.

BRIEF DESCRIPTION OF THE DRAWINGS

The foregoing aspects and other features are explained in the following description, taken in connection with the accompanying drawings, wherein:

FIG. 6 is a table representing results obtained by applying residual encoding (RE) with and without a switching mechanism.

DETAILED DESCRIPTION OF EXAMPLE EMBODIMENTS

Described herein is predictive and residual coding of sparse signals for weight update compression. The models for which weight updates are compressed may perform any task, such as data compression, data decompression, video compression, video decompression, image or video classification, object classification, object detection, object tracking, speech recognition, language translation, music transcription, etc.

Figure 1:
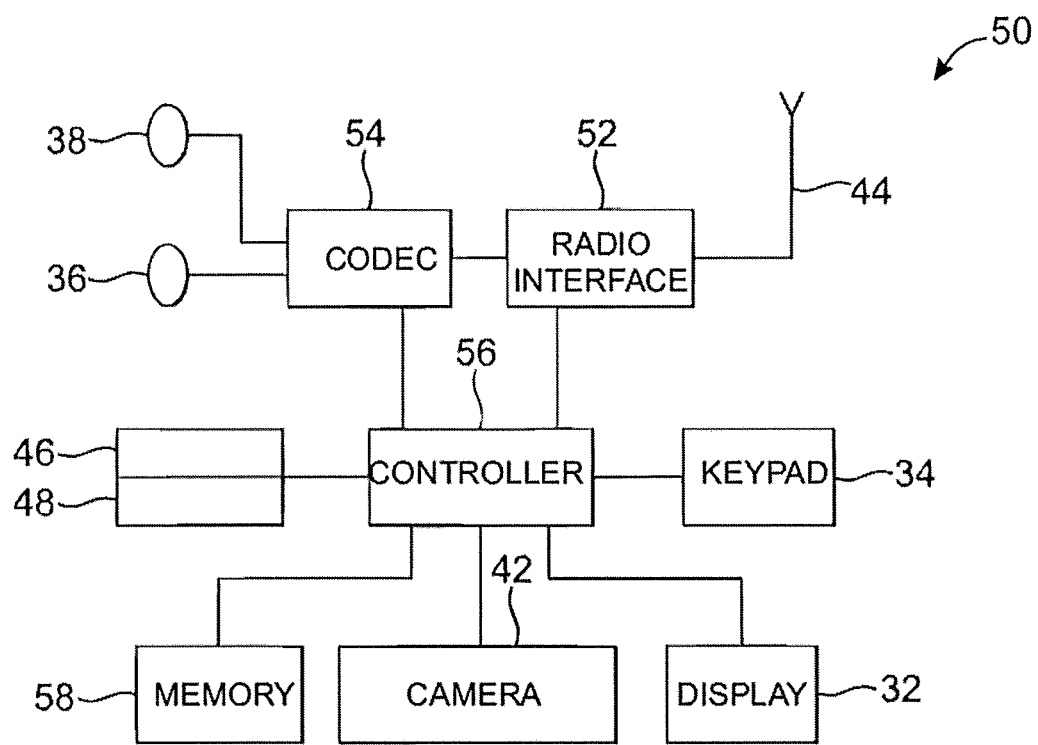
FIG. 1 shows schematically an electronic device employing embodiments of the examples described herein.
Figure 2:
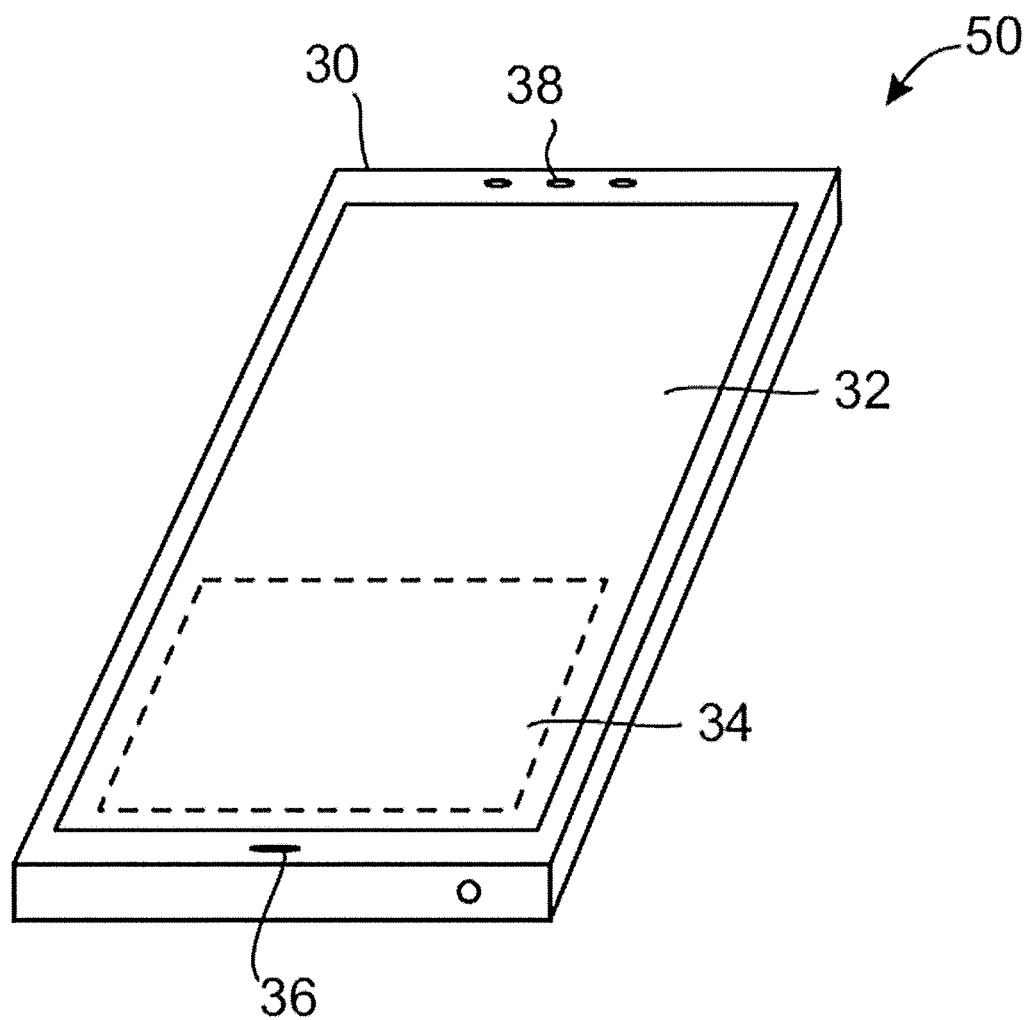
FIG. 2 shows schematically a user equipment suitable for employing embodiments of the examples described herein.

The following describes in detail a suitable apparatus and possible mechanisms for a predictive and residual coding of sparse signals for weight update compression according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a neural network weight update coding system, which may incorporate a codec. FIG. 2 shows a layout of an apparatus according to an example embodiment. The elements of FIG. 1 and FIG. 2 are explained next.

The electronic device 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analog signal input. The apparatus 50 may further comprise an audio output device which in embodiments of the examples described herein may be any one of: an earpiece 38, speaker, or an analog audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding/compression of neural network weight updates and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data or machine learning data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
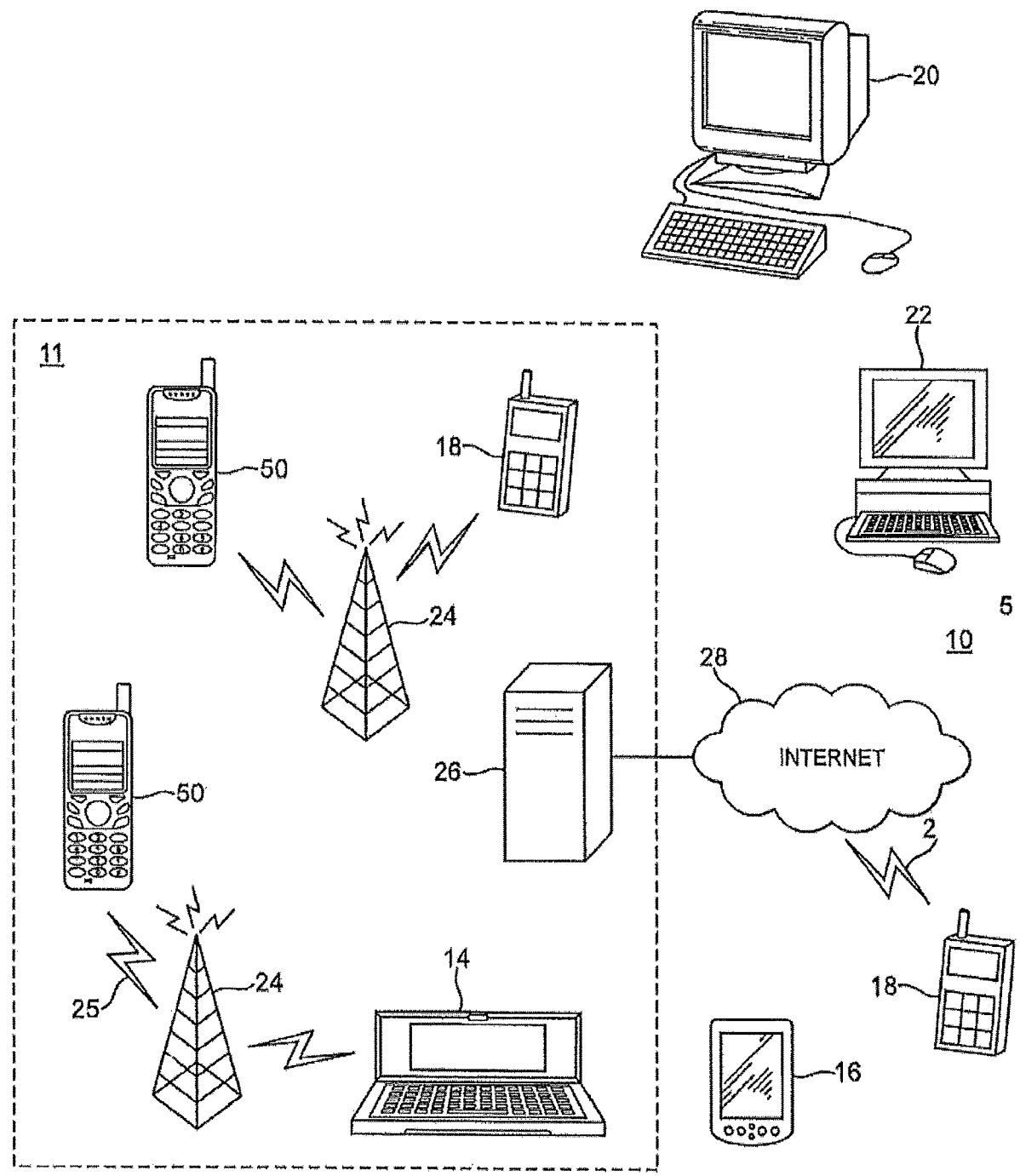
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport, or a head mounted display (HMD).

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, etc. to be included in the Internet of Things (IoT). In order to utilize the Internet IoT devices are provided with an IP address as a unique identifier. IoT devices may be provided with a radio transmitter, such as a WLAN or Bluetooth transmitter or a RFID tag. Alternatively, IoT devices may have access to an IP-based network via a wired network, such as an Ethernet-based network or a power-line connection (PLC).

One important application where reducing the bitrate of weight-updates is important, is the use case of neural network based codecs, such as neural network based video codecs. Video codecs may use one or more neural networks. In a first case, the video codec may be a conventional video codec such as the Versatile Video Codec (VVC/H.266) that has been modified to include one or more neural networks. Examples of these neural networks are:
1. a neural network filter to be used as one of the in-loop filters of VVC
2. a neural network filter to replace one or more of the in-loop filter(s) of VVC
3. a neural network filter to be used as a post-processing filter
4. a neural network to be used for performing intra-frame prediction
5. a neural network to be used for performing inter-frame prediction.

In a second case, which is usually referred to as an end-to-end learned video codec, the video codec may comprise a neural network that transforms the input data into a more compressible representation. The new representation may be quantized, lossless compressed, then lossless decompressed, dequantized, and then another neural network may transform its input into reconstructed or decoded data.

In both of the above two cases, there may be one or more neural networks at the decoder-side, and consider the example of one neural network filter. The encoder may finetune the neural network filter by using the ground-truth data which is available at encoder side (the uncompressed data). Finetuning may be performed in order to improve the neural network filter when applied to the current input data, such as to one or more video frames. Finetuning may comprise running one or more optimization iterations on some or all the learnable weights of the neural network filter. An optimization iteration may comprise computing gradients of a loss function with respect to some or all the learnable weights of the neural network filter, for example by using the backpropagation algorithm, and then updating the some or all learnable weights by using an optimizer, such as the Stochastic Gradient Descent optimizer. The loss function may comprise one or more loss terms. One example loss term may be the mean squared error (MSE). Other distortion metrics may be used as the loss terms. The loss function may be computed by providing one or more data to the input of the neural network filter, obtaining one or more corresponding outputs from the neural network filter, and computing a loss term by using the one or more outputs from the neural network filter and one or more ground-truth data. The difference between the weights of the finetuned neural network and the weights of the neural network before finetuning is referred to as the weight-update. This weight-update needs to be encoded, provided to the decoder side together with the encoded video data, and used at the decoder side for updating the neural network filter. The updated neural network filter is then used as part of the video decoding process or as part of the video post-processing process. It is desirable to encode the weight-update such that it requires a small number of bits. Thus, the examples described herein consider also this use case of neural network based codecs as a potential application of the compression of weight-updates.

In further description of the neural network based codec use case, an MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

A video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically the encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process as temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in the spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
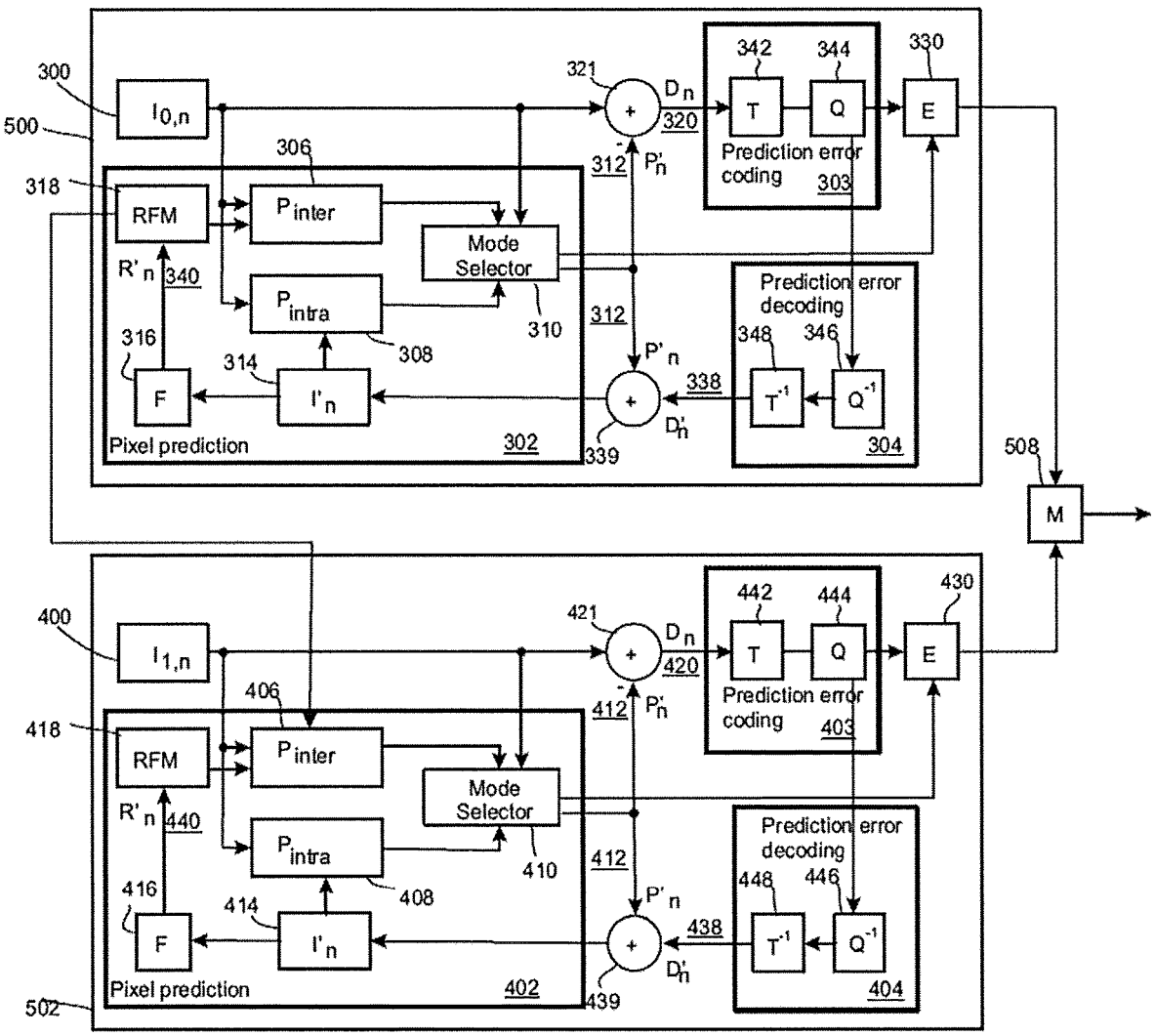
FIG. 4 shows schematically a block chart of an encoder used for data compression on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406 ($P_{inter}$), an intra-predictor 308, 408 ($P_{intra}$), a mode selector 310, 410, a filter 316, 416 (F), and a reference frame memory 318, 418 (RFM). The pixel predictor 302 of the first encoder section 500 receives 300 base layer images ($I_{0,n}$) of a video stream to be encoded at both the inter-predictor 306 (which determines the difference between the image and a motion compensated reference frame 318) and the intra-predictor 308 (which determines a prediction for an image block based only on the already processed parts of the current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images ($I_{1,n}$) of a video stream to be encoded at both the inter-predictor 406 (which determines the difference between the image and a motion compensated reference frame 418) and the intra-predictor 408 (which determines a prediction for an image block based only on the already processed parts of the current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 ($D_n$) which is input to the prediction error encoder 303, 403.

The pixel predictor 302, 402 further receives from a preliminary reconstructor 339, 439 the combination of the prediction representation of the image block 312, 412 ($P'_n$) and the output 338, 438 ($D'_n$) of the prediction error decoder 304, 404. The preliminary reconstructed image 314, 414 ($I'_n$) may be passed to the intra-predictor 308, 408 and to the filter 316, 416. The filter 316, 416 receiving the preliminary representation may filter the preliminary representation and output a final reconstructed image 340, 440 ($R'_n$) which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be the source for inter-layer sample prediction and/or inter-layer motion information prediction of the enhancement layer according to some embodiments, the reference frame memory 318 may also be connected to the inter-predictor 406 to be used as the reference image against which a future enhancement layer picture 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be the source for predicting the filtering parameters of the enhancement layer according to some embodiments.

The prediction error encoder 303, 403 comprises a transform unit 342, 442 (T) and a quantizer 344, 444 (Q). The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder 304, 404 may be considered to comprise a dequantizer 346, 446 ($Q^{-1}$), which dequantizes the quantized coefficient values, e.g. DCT coefficients, to reconstruct the transform signal and an inverse transformation unit 348, 448 ($T^{-1}$), which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 (E) receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508 (M).

Predictive Residual Encoding (PRE) refers to the process of encoding an estimated residual in terms of previously observed values to retain an updated model of the system when lacking precise information. It is vastly applied in various disciplines including video and signal coding where a residual of two signals, a signal of interest and a known base signal, could be approximated using an estimator. The residual could then be used to reconstruct the original signal of interest given the base known signal. This allows compression of information required to transfer over a limited bandwidth channel because of the sparse nature of the residual. Most of the current techniques are concerned about dense signals.

In neural network compression, specifically, weight update compression, the residual of weight updates could be encoded using predictive residual encoding. That is, the difference of two weight updates could be encoded using an estimator.

For sparse signals, when the base signal and/or the signal of interest are sparse, the residual coding may not lead to compression as the residual of sparse signals could be dense. Performing predictive coding and learning an estimator could be less effective because transferring the residue of the estimate with respect to the original signal and the approximation method may be necessary to reduce the error, which increases the bitstream significantly. Thus, both predictive encoding, residual encoding and their combination (i.e., predictive residual encoding) may be less communication efficient for sparse signals.

U.S. provisional patent application 63/173,583 describes a predictive residual encoding technique to compress the weight updates for the purpose of incremental neural network compression. The proposed method consists of two modes of operation, (1) a residual encoding scheme, that calculates and transfers the residual of two weight updates, and (2) a predictive mode of operation that uses an estimator. The described method is designed to work with dense weight updates.

Applied to sparsified and/or quantized signals, the method described in U.S. provisional patent application 63/173,583 may be ineffective in achieving a compressed representation because the residual of the weight updates could be less sparse than the original sparsified weight update.

Recently, Yue et al., proposed a similar method for predictive coding of weight updates in which the predictive coding is applied to dense weight update tensors, where the coefficients of the estimator and the estimation error are communicated.

Described herein is an intelligent algorithm to enable predictive and residual coding of sparse signals. The invention includes a switching mechanism and criteria to determine what data (e.g. the residual, original signal, coefficients of estimator, etc.) is to be transferred over the communication channel by determining the mode of operation.

The algorithm is valid for both residual encoding of sparse signals and predictive residual encoding of sparse signals.

Figure 5:
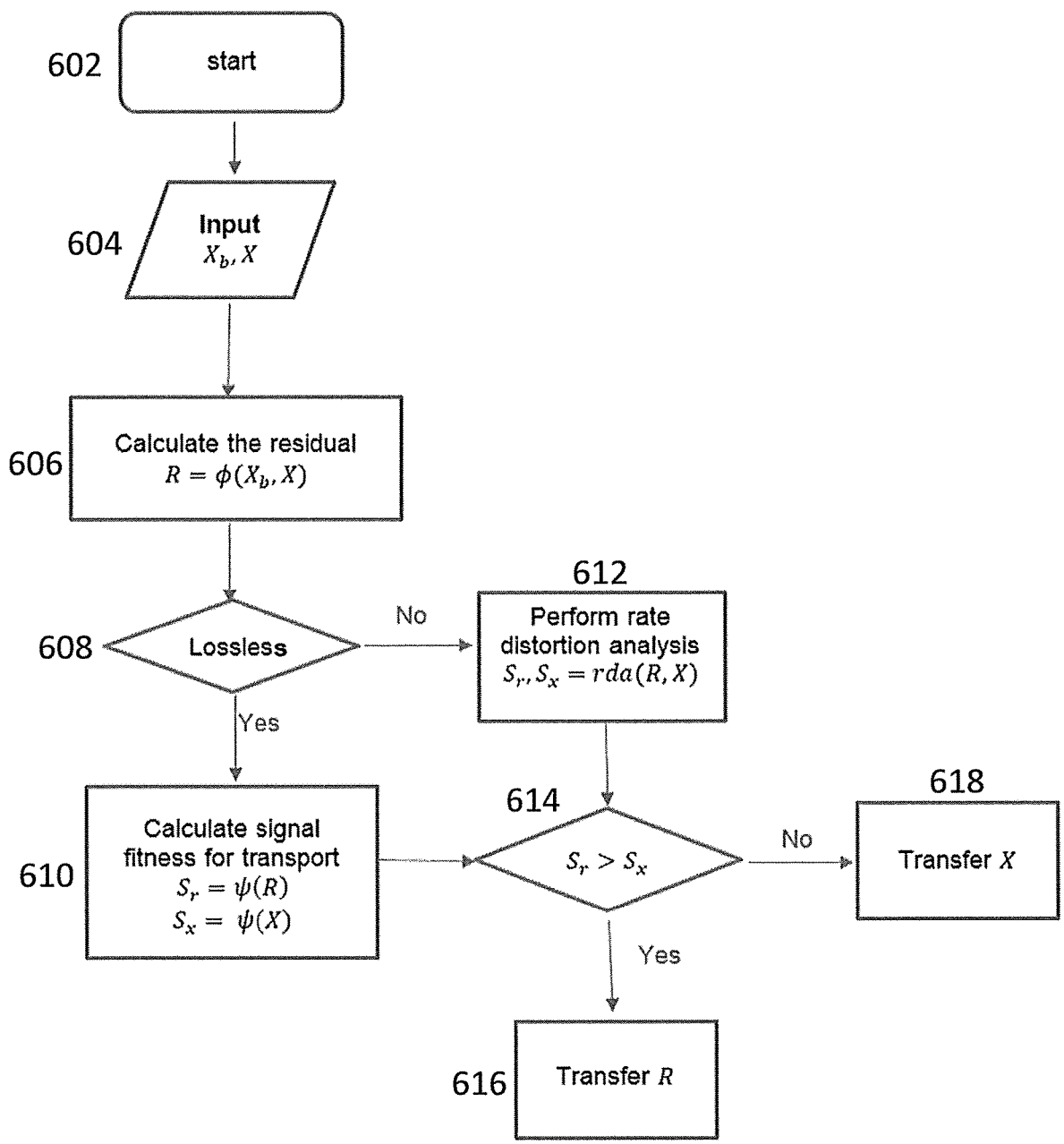
FIG. 5 is a flowchart depicting a process for residual coding of sparse signals.

(a) Residual Encoding of Sparse Signals:

To perform residual encoding on sparse signals, a mode switching function is described, where the mode switching function determines whether the residual is sent or the original sparse signal is sent. In lossless conditions, such function could be implemented in terms of a signal quality measure, e.g., nonzero ratio, entropy, cross-entropy, etc. using the original signal as context. In both lossy and lossless conditions, a rate distortion criterion could be used to determine the fitness of the residual or the original signal for transport. The flowchart of FIG. 5 depicts the process.

The function $\phi(\ )$ calculates the residual of two signals, e.g. a base signal $X_b$ and original signal X. As an example for residual estimation, for two equally sized vectors the residual is obtained by calculating the difference of two vectors. $\psi(\ )$ is a function to measure the fitness of the signal, e.g., the number of nonzeros or some measure of information like entropy. The function rda( ) analyzes the rate distortion of two signals and summarizes the fitness for a specific bitrate, e.g., in terms of accuracy or error. A lossy path is chosen whenever there is some element that affects the accuracy versus the bitstream, e.g., there is a quantization step after calculation of the residual, whereas a lossless path happens if the residual is calculated over the already quantized residuals. Finally, the subscript r represents the residual signal, while subscript x demonstrates the original signal.

Accordingly, at 602, the process starts. At 604, input is received, the input being values $X_b$ and X. At 606, the residual is calculated as $R=\phi(X_b,X)$. At 608, a determination is made whether or not to choose a lossless path. If a lossless path is chosen (e.g. "Yes"), the method transitions to 610. If a lossless path is not chosen (e.g. "No"), the method transitions to 612. At 610, signal fitness for transport is calculated as $S_r=\psi(R)$, $S_x=\psi)(X)$. At 612, rate distortion analysis is performed as $S_r,S_x=rda(R,X)$. Following 610 and 612, the method transitions to 614. At 614, a determination is made whether $S_r > S_x$. If $S_r > S_x$ e.g. "Yes", then the process transitions to 616 where R is transferred. If $S_r \leq S_x$, e.g. a "No" determination at 614, then the process transitions to 618 where is X is transferred.

(b) Predictive Encoding of Sparse Signals:

The predictive encoding employs an estimator to obtain a signal approximated from a history of observed signals and/or previously estimated signals. After such approximation, a series of coefficients and an error could be communicated. For sparse signals, the error residue could be dense and sacrifice significant amount of bitstream. Similar to the method described previously, whenever the rate distortion analysis suggests, the original signal or its residual coded equivalent [obtained from the procedure description provided in (a)] is to be transferred. The steps could be summarized as (1) Obtain coefficients of the predictive encoding.
(2) Calculate the original signal and the residual of the approximation.
(3) Perform the algorithm of (a)—Residual encoding of sparse signals, and if the approximation is chosen to transfer, transfer also the coefficients of the estimator.

In an alternative embodiment, if the rate distortion suggests, the estimator's coefficients may only be transferred.

Results

An experiment was performed for employing the described switching scheme to encode the residuals of weight updates, which are sparse signals. Table 1 shown in FIG. 6 represents results obtained by applying residual encoding (RE) with and without the switching mechanism to the UC14A task defined in MPEG NNR Call for Proposal (CfP) for incremental weight update compression [refer to ISO/IEC_JTC_1/SC_29/WG_2/N_0016. Call for Proposal on Incremental Compression of Neural Networks for multimedia content description and analysis, October 2020.]. In this experiment, two clients and a server are incrementally training a deep neural network, i.e., vgg16, for 15 rounds. In each round, the clients send their weight updates to the server by applying different sparsification/quantization approaches on the weight updates to make them as compressed as possible, and the server decodes and reconstructs the compressed and encoded weight updates and then aggregates them to update its model. In the Bidirectional mode, i.e., row 1, the server then compresses and sends the weight update of the aggregated model (compared to each client's model) to each client. In the unidirectional mode, only the clients compress their weight updates, while the server communicates the weight updates in the uncompressed mode. Furthermore, in the head-only case, only the weight updates of the last fully connected layer are communicated between the clients and the server, while in the full model case, the weight updates of the whole model are communicated. In the table, RE without switch refers to the case where RE is always applied, while in the RE with switch, the process switches between the anchor and RE. The cumulative bitstream size is in megabyte (MB). Since the residual encoding approach is lossless, there is only a single column for accuracy to represent the level of accuracy obtained for each bitstream size. From the table, it can be seen that RE with switching provides better cumulative bitstream sizes when compared to both RE without switching and anchor.

Figure 7:
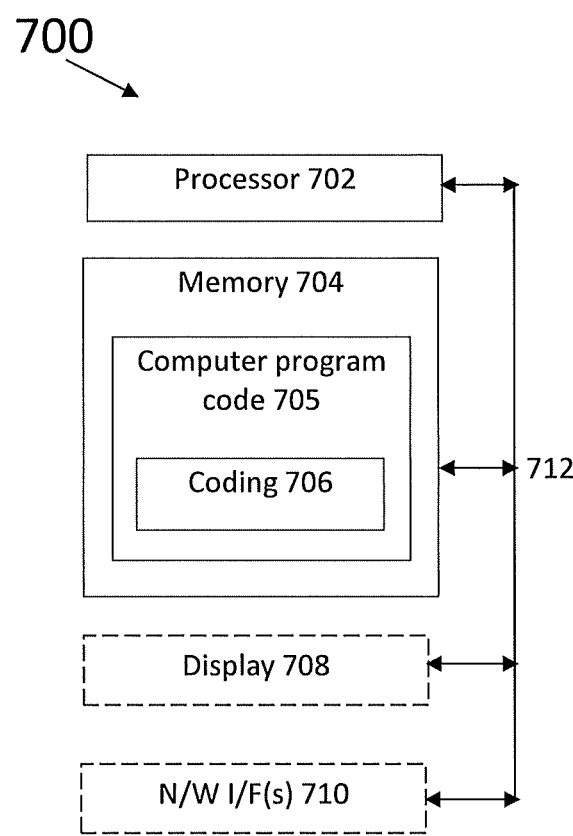
FIG. 7 is an example apparatus configured to implement predictive and residual coding of sparse signals for weight update compression, based on the examples described herein.

FIG. 7 is an example apparatus 700, which may be implemented in hardware, configured to implement predictive and residual coding of sparse signals for weight update compression, based on the examples described herein. The apparatus 700 comprises a processor 702, at least one memory 704 including computer program code 705, wherein the at least one memory 704 and the computer program code 705 are configured to, with the at least one processor 702, cause the apparatus to implement coding 706 to implement predictive and residual coding of sparse signals for weight update compression, based on the examples described herein. The apparatus 700 optionally includes a display 708 that may be used to display content during ML/task/machine/NN processing or rendering. The apparatus 700 optionally includes one or more network (N/W) interfaces (I/F(s)) 710. The N/W I/F(s) 710 may be wired and/or wireless and communicate over the Internet/other network(s) via any communication technique. The N/W I/F(s) 710 may comprise one or more transmitters and one or more receivers. The N/W I/F(s) 710 may comprise standard well-known components such as an amplifier, filter, frequency-converter, (de)modulator, and encoder/decoder circuitry(ies) and one or more antennas. In some examples, the processor 702 is configured to implement coding 706 without use of memory 704.

The memory 704 may be implemented using any suitable data storage technology, such as semiconductor based memory devices, flash memory, magnetic memory devices and systems, optical memory devices and systems, non-transitory memory, transitory memory, volatile memory, non-volatile memory, fixed memory and removable memory. The memory 704 may comprise a database for storing data.

Interface 712 enables data communication between the various items of apparatus 700, as shown in FIG. 7. Interface 712 may be one or more buses such as address, data, or control buses, and may include any interconnection mechanism, such as a series of lines on a motherboard or integrated circuit, fiber optics or other optical communication equipment, and the like. The apparatus 700 need not comprise each of the features mentioned, or may comprise other features as well. The apparatus 700 may be an embodiment of apparatuses shown in FIG. 1, FIG. 2, FIG. 3, or FIG. 4, including any combination of those.

Figure 8:
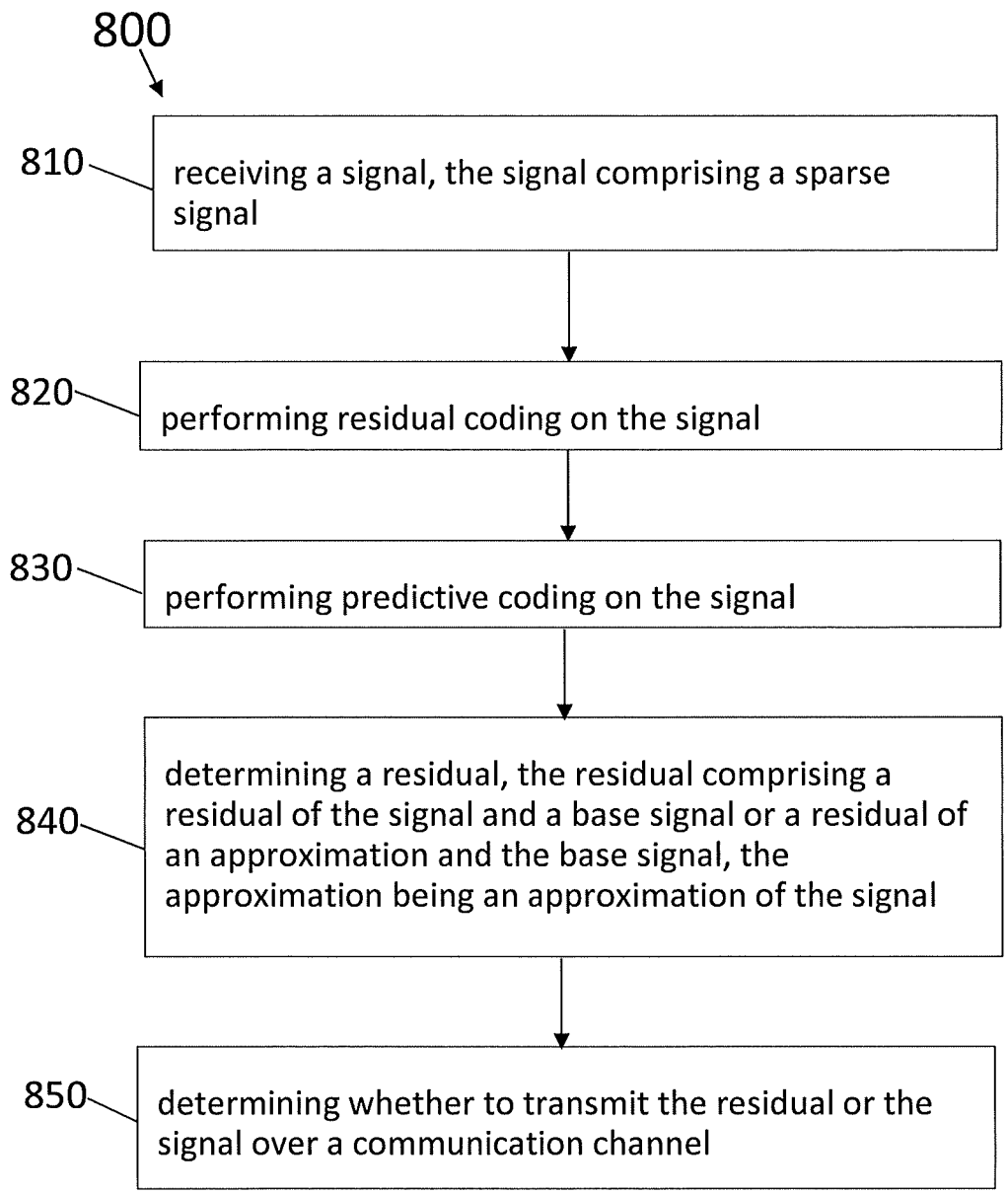
FIG. 8 is an example method to implement predictive and residual coding of sparse signals for weight update compression, based on the examples described herein.

FIG. 8 is an example method 800 to implement a predictive and residual coding of sparse signals for weight update compression. At 810, the method includes receiving a signal, the signal comprising a sparse signal. At 820, the method includes performing residual coding on the signal. At 830, the method includes performing predictive coding on the signal. At 840, the method includes determining a residual, the residual comprising a residual of the signal and a base signal or a residual of an approximation and the base signal, the approximation being an approximation of the signal. At 850, the method includes determining whether to transmit the residual or the signal over a communication channel.

Figure 9:
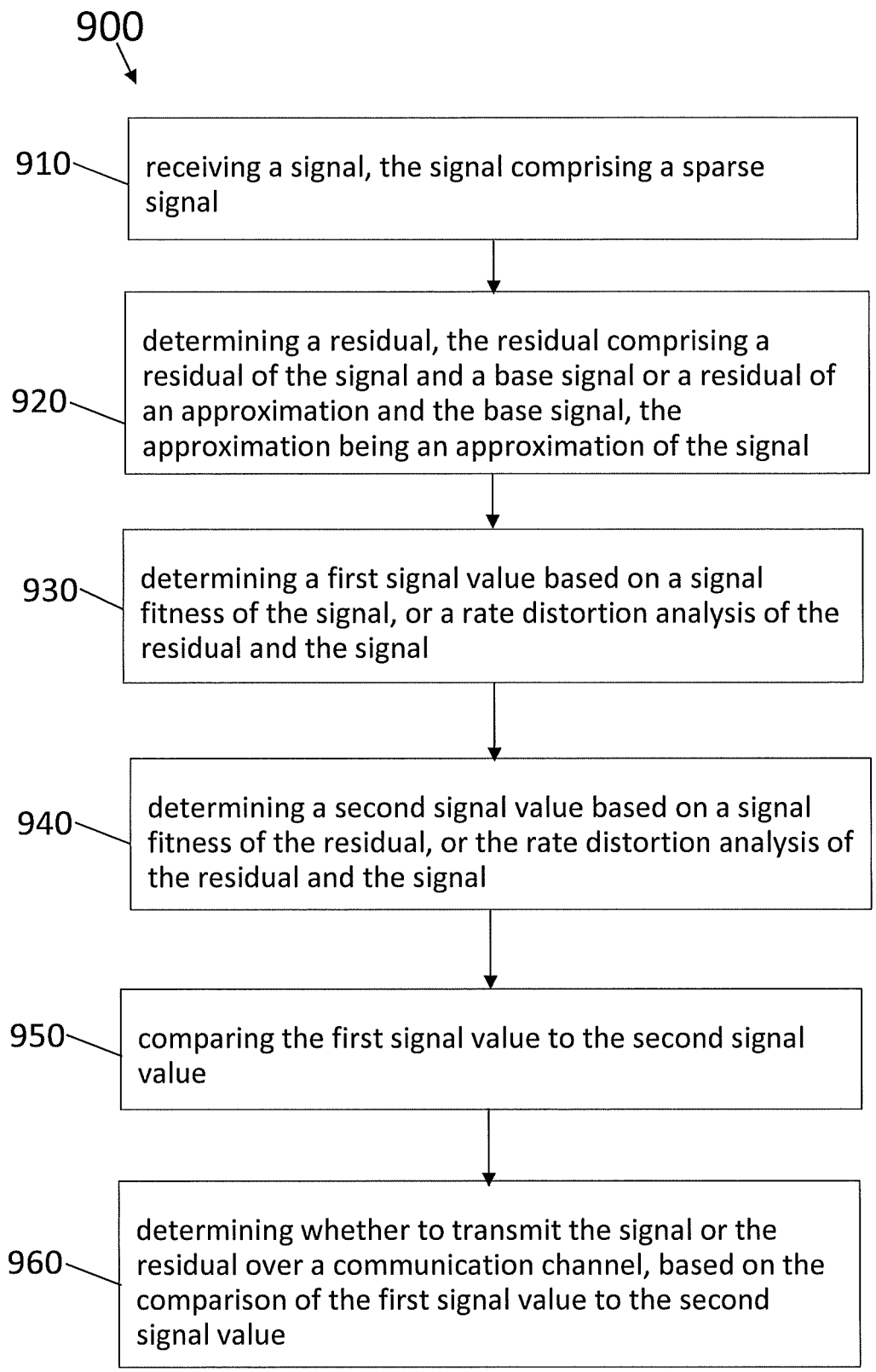
FIG. 9 is an example method to implement residual coding of sparse signals for weight update compression, based on the examples described herein.

FIG. 9 is an example method 900 to implement a residual coding of sparse signals for weight update compression. At 910, the method includes receiving a signal, the signal comprising a sparse signal. At 920, the method includes determining a residual, the residual comprising a residual of the signal and a base signal or a residual of an approximation and the base signal, the approximation being an approximation of the signal. At 930, the method includes determining a first signal value based on a signal fitness of the signal, or a rate distortion analysis of the residual and the signal. At 940, the method includes determining a second signal value based on a signal fitness of the residual, or the rate distortion analysis of the residual and the signal. At 950, the method includes comparing the first signal value to the second signal value. At 960, the method includes determining whether to transmit the signal or the residual over a communication channel, based on the comparison of the first signal value to the second signal value.

Figure 10:
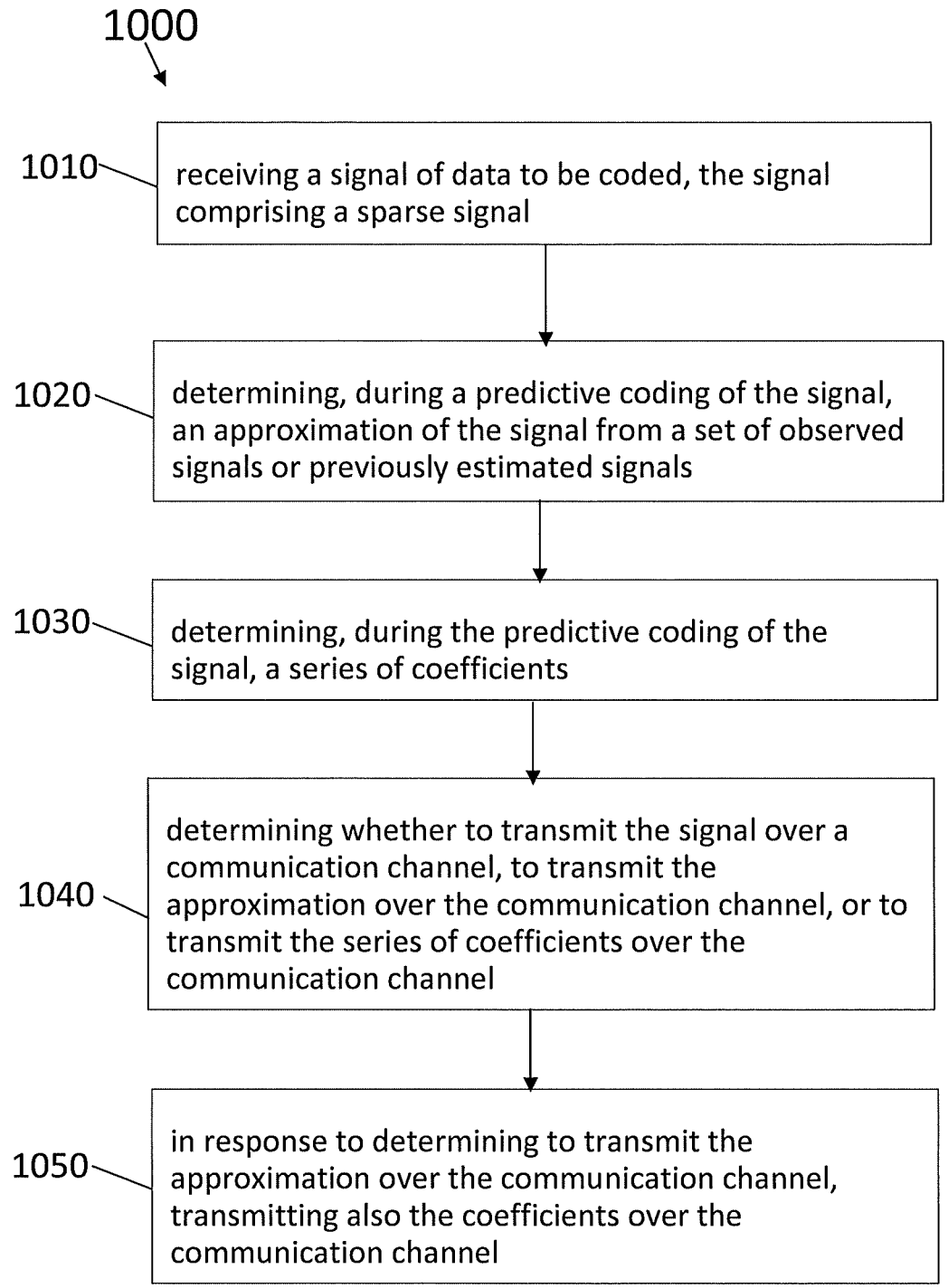
FIG. 10 is an example method to implement predictive coding of sparse signals for weight update compression, based on the examples described herein.

FIG. 10 is an example method 1000 to implement a predictive coding of sparse signals for weight update compression. At 1010, the method includes receiving a signal of data to be coded, the signal comprising a sparse signal. At 1020, the method includes determining, during a predictive coding of the signal, an approximation of the signal from a set of observed signals or previously estimated signals. At 1030, the method includes determining, during the predictive coding of the signal, a series of coefficients. At 1040, the method includes determining whether to transmit the signal over a communication channel, to transmit the approximation over the communication channel, or to transmit the series of coefficients over the communication channel. At 1050, the method includes in response to determining to transmit the approximation over the communication channel, transmitting also the coefficients over the communication channel.

Figure 11:
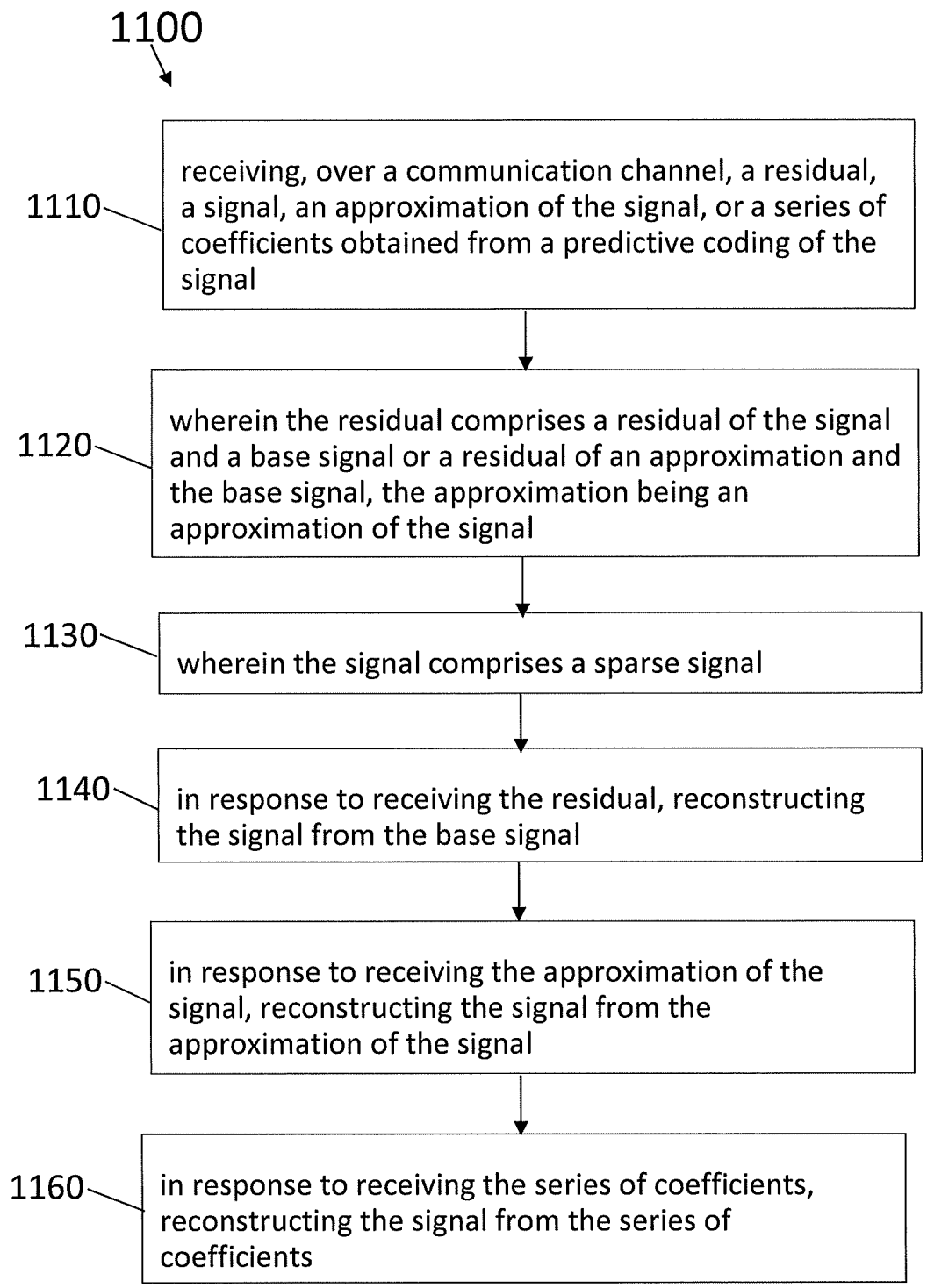
FIG. 11 is an example method to implement decoding of sparse signals, based on the examples described herein.

FIG. 11 is an example method 1100 to implement decoding of sparse signals for weight update compression. At 1110, the method includes receiving, over a communication channel, a residual, a signal, an approximation of the signal, or a series of coefficients obtained from a predictive coding of the signal. At 1120, the method includes wherein the residual comprises a residual of the signal and a base signal or a residual of an approximation and the base signal, the approximation being an approximation of the signal. At 1130, the method includes wherein the signal comprises a sparse signal. At 1140, the method includes in response to receiving the residual, reconstructing the signal from the base signal. At 1150, the method includes in response to receiving the approximation of the signal, reconstructing the signal from the approximation of the signal. At 1160, the method includes in response to receiving the series of coefficients, reconstructing the signal from the series of coefficients.

References to a 'computer', 'processor', etc. should be understood to encompass not only computers having different architectures such as single/multi-processor architectures and sequential/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry', 'circuit' and variants may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/ software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry or circuit may also be used to mean a function or a process used to execute a method.

The following examples (1-40) are described and provided herein.

Example 1: An apparatus includes at least one processor; and at least one memory including computer program code; wherein the at least one memory and the computer program code are configured to, with the at least one processor, cause the apparatus at least to: receive a signal, the signal comprising a sparse signal; perform residual coding on the signal; perform predictive coding on the signal; determine a residual, the residual comprising a residual of the signal and a base signal or a residual of an approximation and the base signal, the approximation being an approximation of the signal; and determine whether to transmit the residual or the signal over a communication channel.

Example 2: The apparatus of example 1, wherein the at least one memory and the computer program code are further configured to, with the at least one processor, cause the apparatus at least to: determine a first signal value based on a signal fitness of the signal, or a rate distortion analysis of the residual and the signal; determine a second signal value based on a signal fitness of the residual, or the rate distortion analysis of the residual and the signal; and compare the first signal value to the second signal value; wherein the determining of whether to transmit the signal or the residual over the communication channel is based on the comparison of the first signal value to the second signal value.

Example 3: The apparatus of example 2, wherein the at least one memory and the computer program code are further configured to, with the at least one processor, cause the apparatus at least to: transmit the residual over the communication channel, in response to the second signal value being greater than the first signal value; and transmit the signal over the communication channel, in response to the second signal value being less than or equal to the first signal value.

Example 4: The apparatus of any one of examples 2 to 3, wherein the at least one memory and the computer program code are further configured to, with the at least one processor, cause the apparatus at least to: determine whether to select a lossless path, the lossless path being when an element does not affect bitstream accuracy; in response to selecting the lossless path, the first signal value is determined based on the signal fitness of the signal, and the second signal value is determined based on the signal fitness of the residual; and in response to not selecting the lossless path, the first signal value is determined based on the rate distortion analysis of the residual and the signal, and the second signal value is determined based on the rate distortion analysis of the residual and the signal.

Example 5: The apparatus of any one of examples 2 to 4, wherein the rate distortion analysis comprises at least one of nonzero ratio, entropy, or cross-entropy.

Example 6: The apparatus of any one of examples 1 to 5, wherein the at least one memory and the computer program code are further configured to, with the at least one processor, cause the apparatus at least to: determine, during the predictive coding of the signal, the approximation of the signal from a set of observed signals or previously estimated signals; determine, during the predictive coding of the signal, a series of coefficients; and determine whether to transmit the signal over the communication channel, to transmit the approximation over the communication channel, or to transmit the series of coefficients over the communication channel.

Example 7: The apparatus of example 6, wherein the at least one memory and the computer program code are further configured to, with the at least one processor, cause the apparatus at least to: in response to determining to transmit the approximation over the communication channel, transmit also the coefficients over the communication channel.

Example 8: The apparatus of any one of examples 6 to 7, wherein the at least one memory and the computer program code are further configured to, with the at least one processor, cause the apparatus at least to: transmit the series of coefficients over the communication channel, based on a rate distortion analysis.

Example 9: The apparatus of any one of examples 1 to 8, wherein the at least one memory and the computer program code are further configured to, with the at least one processor, cause the apparatus at least to: determine, during the predictive coding of the signal, the approximation of the signal from a set of observed signals or previously estimated signals; determine, during the predictive coding of the signal, a series of coefficients; determine whether to transmit the signal over a communication channel, to transmit the approximation over the communication channel, or to transmit the series of coefficients over the communication channel; and in response to determining to transmit the approximation over the communication channel, transmit also the coefficients over the communication channel.

Example 10: An apparatus includes at least one processor; and at least one memory including computer program code; wherein the at least one memory and the computer program code are configured to, with the at least one processor, cause the apparatus at least to: receive a signal, the signal comprising a sparse signal; determine a residual, the residual comprising a residual of the signal and a base signal or a residual of an approximation and the base signal, the approximation being an approximation of the signal; determine a first signal value based on a signal fitness of the signal, or a rate distortion analysis of the residual and the signal; determine a second signal value based on a signal fitness of the residual, or the rate distortion analysis of the residual and the signal; compare the first signal value to the second signal value; and determine whether to transmit the signal or the residual over a communication channel, based on the comparison of the first signal value to the second signal value.

Example 11: The apparatus of example 10, wherein the at least one memory and the computer program code are further configured to, with the at least one processor, cause the apparatus at least to: transmit the residual over the communication channel, in response to the second signal value being greater than the first signal value; and transmit the signal over the communication channel, in response to the second signal value being less than or equal to the first signal value.

Example 12: The apparatus of any one of examples 10 to 11, wherein the at least one memory and the computer program code are further configured to, with the at least one processor, cause the apparatus at least to: determine whether to select a lossless path, the lossless path being when an element does not affect bitstream accuracy; in response to selecting the lossless path, the first signal value is determined based on the signal fitness of the signal, and the second signal value is determined based on the signal fitness of the residual; and in response to not selecting the lossless path, the first signal value is determined based on the rate distortion analysis of the residual and the signal, and the second signal value is determined based on the rate distortion analysis of the residual and the signal.

Example 13: The apparatus of any one of examples 10 to 12, wherein the rate distortion analysis comprises at least one of nonzero ratio, entropy, or cross-entropy.

Example 14: The apparatus of any one of examples 10 to 13, wherein the at least one memory and the computer program code are further configured to, with the at least one processor, cause the apparatus at least to: determine, during a predictive coding of the signal, the approximation of the signal from a set of observed signals or previously estimated signals; determine, during the predictive coding of the signal, a series of coefficients; and determine whether to transmit the signal over a communication channel, to transmit the approximation over the communication channel, or to transmit the series of coefficients over the communication channel.

Example 15: The apparatus of claim 14, wherein the at least one memory and the computer program code are further configured to, with the at least one processor, cause the apparatus at least to: in response to determining to transmit the approximation over the communication channel, transmit also the coefficients over the communication channel.

Example 16: An apparatus includes at least one processor; and at least one memory including computer program code; wherein the at least one memory and the computer program code are configured to, with the at least one processor, cause the apparatus at least to: receive a signal of data to be coded, the signal comprising a sparse signal; determine, during a predictive coding of the signal, an approximation of the signal from a set of observed signals or previously estimated signals; determine, during the predictive coding of the signal, a series of coefficients; determine whether to transmit the signal over a communication channel, to transmit the approximation over the communication channel, or to transmit the series of coefficients over the communication channel; and in response to determining to transmit the approximation over the communication channel, transmit also the coefficients over the communication channel.

Example 17: The apparatus of example 16, wherein the at least one memory and the computer program code are further configured to, with the at least one processor, cause the apparatus at least to: determine a residual of the approximation of the signal and a base signal; determine a first signal value based on a signal fitness of the signal, or a rate distortion analysis of the residual and the signal; determine a second signal value based on a signal fitness of the residual, or the rate distortion analysis of the residual and the signal; compare the first signal value to the second signal value; and determine whether to transmit the signal or the residual over a communication channel, based on the comparison of the first signal value to the second signal value.

Example 18: The apparatus of example 17, wherein the at least one memory and the computer program code are further configured to, with the at least one processor, cause the apparatus at least to: transmit the residual over the communication channel, in response to the second signal value being greater than the first signal value; and transmit the signal over the communication channel, in response to the second signal value being less than or equal to the first signal value.

Example 19: The apparatus of any one of examples 17 to 18, wherein the at least one memory and the computer program code are further configured to, with the at least one processor, cause the apparatus at least to: determine whether to select a lossless path, the lossless path being when an element does not affect bitstream accuracy; in response to selecting the lossless path, the first signal value is determined based on the signal fitness of the signal, and the second signal value is determined based on the signal fitness of the residual; and in response to not selecting the lossless path, the first signal value is determined based on the rate distortion analysis of the residual and the signal, and the second signal value is determined based on the rate distortion analysis of the residual and the signal.

Example 20: The apparatus of any one of examples 17 to 19, wherein the rate distortion analysis comprises at least one of nonzero ratio, entropy, or cross-entropy.

Example 21: The apparatus of any one of examples 1 to 9, wherein the residual is configured to be used to reconstruct the signal.

Example 22: The apparatus of any one of examples 1 to 9 and 21, wherein the residual is approximated using an estimator.

Example 23: The apparatus of any one of examples 1 to 9 and 21 to 22, wherein the at least one memory and the computer program code are further configured to, with the at least one processor, cause the apparatus at least to: transmit, to a server, a weight update of a first neural network; and receive, from the server, a weight update of a second neural network.

Example 24: The apparatus of any one of examples 1 to 9 and 21 to 23, wherein the at least one memory and the computer program code are further configured to, with the at least one processor, cause the apparatus at least to: transmit, to a server, a last fully connected layer of a first neural network; and receive, from the server, a last fully connected layer of a second neural network.

Example 25. An apparatus includes at least one processor; and at least one memory including computer program code; wherein the at least one memory and the computer program code are configured to, with the at least one processor, cause the apparatus at least to: receive, over a communication channel, a residual, a signal, an approximation of the signal, or a series of coefficients obtained from a predictive coding of the signal; wherein the residual comprises a residual of the signal and a base signal or a residual of an approximation and the base signal, the approximation being an approximation of the signal; wherein the signal comprises a sparse signal; in response to receiving the residual, reconstruct the signal from the base signal; in response to receiving the approximation of the signal, reconstruct the signal from the approximation of the signal; and in response to receiving the series of coefficients, reconstruct the signal from the series of coefficients.

Example 26: The apparatus of example 25, wherein the residual or the signal is received depending on a signal fitness of the residual and the signal, or depending on a rate distortion analysis of the signal and the residual.

Example 27: The apparatus of any one of examples 25 to 26, wherein the at least one memory and the computer program code are further configured to, with the at least one processor, cause the apparatus at least to: receive the residual, in response to a fitness of the residual being greater than a fitness of the signal; and receive the signal, in response to the fitness of the signal being equal to or greater than the fitness of the residual.

Example 28: The apparatus of any one of examples 25 to 27, wherein the at least one memory and the computer program code are further configured to, with the at least one processor, cause the apparatus at least to: in response to receiving the approximation of the signal, receive also the series of coefficients obtained from the predictive coding of the signal.

Example 29: A method includes receiving a signal, the signal comprising a sparse signal; performing residual coding on the signal; performing predictive coding on the signal; determining a residual, the residual comprising a residual of the signal and a base signal or a residual of an approximation and the base signal, the approximation being an approximation of the signal; and determining whether to transmit the residual or the signal over a communication channel.

Example 30: A method includes receiving a signal, the signal comprising a sparse signal; determining a residual, the residual comprising a residual of the signal and a base signal or a residual of an approximation and the base signal, the approximation being an approximation of the signal; determining a first signal value based on a signal fitness of the signal, or a rate distortion analysis of the residual and the signal; determining a second signal value based on a signal fitness of the residual, or the rate distortion analysis of the residual and the signal; comparing the first signal value to the second signal value; and determining whether to transmit the signal or the residual over a communication channel, based on the comparison of the first signal value to the second signal value.

Example 31: A method includes receiving a signal of data to be coded, the signal comprising a sparse signal; determining, during a predictive coding of the signal, an approximation of the signal from a set of observed signals or previously estimated signals; determining, during the predictive coding of the signal, a series of coefficients; determining whether to transmit the signal over a communication channel, to transmit the approximation over the communication channel, or to transmit the series of coefficients over the communication channel; and in response to determining to transmit the approximation over the communication channel, transmitting also the coefficients over the communication channel.

Example 32: A method includes receiving, over a communication channel, a residual, a signal, an approximation of the signal, or a series of coefficients obtained from a predictive coding of the signal; wherein the residual comprises a residual of the signal and a base signal or a residual of an approximation and the base signal, the approximation being an approximation of the signal; wherein the signal comprises a sparse signal; in response to receiving the residual, reconstructing the signal from the base signal; in response to receiving the approximation of the signal, reconstructing the signal from the approximation of the signal; and in response to receiving the series of coefficients, reconstructing the signal from the series of coefficients.

Example 33: An apparatus includes means for receiving a signal, the signal comprising a sparse signal; means for performing residual coding on the signal; means for performing predictive coding on the signal; means for determining a residual, the residual comprising a residual of the signal and a base signal or a residual of an approximation and the base signal, the approximation being an approximation of the signal; and means for determining whether to transmit the residual or the signal over a communication channel.

Example 34: An apparatus includes means for receiving a signal, the signal comprising a sparse signal; means for determining a residual, the residual comprising a residual of the signal and a base signal or a residual of an approximation and the base signal, the approximation being an approximation of the signal; means for determining a first signal value based on a signal fitness of the signal, or a rate distortion analysis of the residual and the signal; means for determining a second signal value based on a signal fitness of the residual, or the rate distortion analysis of the residual and the signal; means for comparing the first signal value to the second signal value; and means for determining whether to transmit the signal or the residual over a communication channel, based on the comparison of the first signal value to the second signal value.

Example 35: An apparatus includes means for receiving a signal of data to be coded, the signal comprising a sparse signal; means for determining, during a predictive coding of the signal, an approximation of the signal from a set of observed signals or previously estimated signals; means for determining, during the predictive coding of the signal, a series of coefficients; means for determining whether to transmit the signal over a communication channel, to transmit the approximation over the communication channel, or to transmit the series of coefficients over the communication channel; and means for, in response to determining to transmit the approximation over the communication channel, transmitting also the coefficients over the communication channel.

Example 36: An apparatus includes means for receiving, over a communication channel, a residual, a signal, an approximation of the signal, or a series of coefficients obtained from a predictive coding of the signal; wherein the residual comprises a residual of the signal and a base signal or a residual of an approximation and the base signal, the approximation being an approximation of the signal; wherein the signal comprises a sparse signal; means for, in response to receiving the residual, reconstructing the signal from the base signal; means for, in response to receiving the approximation of the signal, reconstructing the signal from the approximation of the signal; and means for, in response to receiving the series of coefficients, reconstructing the signal from the series of coefficients.

Example 37: A non-transitory program storage device readable by a machine, tangibly embodying a program of instructions executable with the machine for performing operations, the operations comprising: receiving a signal, the signal comprising a sparse signal; performing residual coding on the signal; performing predictive coding on the signal; determining a residual, the residual comprising a residual of the signal and a base signal or a residual of an approximation and the base signal, the approximation being an approximation of the signal; and determining whether to transmit the residual or the signal over a communication channel.

Example 38: A non-transitory program storage device readable by a machine, tangibly embodying a program of instructions executable with the machine for performing operations, the operations comprising: receiving a signal, the signal comprising a sparse signal; determining a residual, the residual comprising a residual of the signal and a base signal or a residual of an approximation and the base signal, the approximation being an approximation of the signal; determining a first signal value based on a signal fitness of the signal, or a rate distortion analysis of the residual and the signal; determining a second signal value based on a signal fitness of the residual, or the rate distortion analysis of the residual and the signal; comparing the first signal value to the second signal value; and determining whether to transmit the signal or the residual over a communication channel, based on the comparison of the first signal value to the second signal value.

Example 39: A non-transitory program storage device readable by a machine, tangibly embodying a program of instructions executable with the machine for performing operations, the operations comprising: receiving a signal of data to be coded, the signal comprising a sparse signal; determining, during a predictive coding of the signal, an approximation of the signal from a set of observed signals or previously estimated signals; determining, during the predictive coding of the signal, a series of coefficients; determining whether to transmit the signal over a communication channel, to transmit the approximation over the communication channel, or to transmit the series of coefficients over the communication channel; and in response to determining to transmit the approximation over the communication channel, transmitting also the coefficients over the communication channel.

Example 40: A non-transitory program storage device readable by a machine, tangibly embodying a program of instructions executable with the machine for performing operations, the operations comprising: receiving, over a communication channel, a residual, a signal, an approximation of the signal, or a series of coefficients obtained from a predictive coding of the signal; wherein the residual comprises a residual of the signal and a base signal or a residual of an approximation and the base signal, the approximation being an approximation of the signal; wherein the signal comprises a sparse signal; in response to receiving the residual, reconstructing the signal from the base signal; in response to receiving the approximation of the signal, reconstructing the signal from the approximation of the signal; and in response to receiving the series of coefficients, reconstructing the signal from the series of coefficients.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

| | |
|---|---|
| 3GPP | 3rd generation partnership project |
| 4G | fourth generation of broadband cellular network technology |
| 5G | fifth generation cellular network technology |
| 802.x | family of IEEE standards dealing with local area networks and metropolitan area networks |
| Acc. | accuracy |
| ASIC | application specific integrated circuit |
| CDMA | code-division multiple access |
| CfP | call for proposal |
| Cummul. | cumulative |
| DCT | discrete cosine transform |
| DSP | digital signal processor |
| ECSEL | Electronic Components and Systems for European Leadership |
| FDMA | frequency division multiple access |
| FPGA | field programmable gate array |
| GSM | global system for mobile communications |
| H.222.0 | MPEG-2 systems, standard for the generic coding of moving pictures and associated audio |

| | | information |
|---|---|---|
| | H.26x | family of video coding standards in the domain of the ITU-T |
| | HMD | head mounted display |
| | IBC | intra block copy |
| | IEC | International Electrotechnical Commission |
| | IEEE | Institute of Electrical and Electronics Engineers |
| | I/F | interface |
| | IMD | integrated messaging device |
| | IMS | instant messaging service |
| | IoT | internet of things |
| | IP | internet protocol |
| | ISO | International Organization for Standardization |
| | ISOBMFF | ISO base media file format |
| | ITU | International Telecommunication Union |
| | ITU-T | ITU Telecommunication Standardization Sector |
| | JTC | joint technical committee |
| | JU | joint undertaking |
| | LTE | long-term evolution |
| | ML | machine learning |
| | MMS | multimedia messaging service |
| | MPEG | moving picture experts group |
| | MPEG-2 | H.222/H.262 as defined by the ITU |
| | MSE | mean squared error |
| | N | number |
| | NAL | network abstraction layer |
| | NN | neural network |
| | NNR | neural network compression/coding and representation |
| | N/W | network |
| | PC | personal computer |
| | PDA | personal digital assistant |
| | PID | packet identifier |
| | PLC | power line communication |
| | PRE | predictive residual encoding |
| | RE | residual encoding |
| | RFID | radio frequency identification |
| | RFM | reference frame memory |
| | SC | subcommittee |
| | SMS | short messaging service |
| | TCP-IP | transmission control protocol-internet protocol |
| | TDMA | time divisional multiple access |
| | TS | transport stream |
| | TV | television |
| | UICC | universal integrated circuit card |
| | UMTS | universal mobile telecommunications system |
| | USB | universal serial bus |
| | vgg16 | visual geometry group-16 convolutional neural network model of the University of Oxford |
| | VVC | versatile video codec |
| | WG | working group |
| | WLAN | wireless local area network |

What is claimed is:

1. An apparatus comprising:
at least one processor; and
at least one memory storing instructions that, when executed by the at least one processor, cause the apparatus at least to:
receive a signal, the signal comprising a sparse signal;
perform residual coding on the signal;
perform predictive coding on the signal;
determine a residual, the residual comprising a residual of the signal and a base signal or a residual of an approximation and the base signal, the approximation being an approximation of the signal;
determine whether to transmit the residual or the signal over a communication channel;
determine a first signal value based on a signal fitness of the signal, or determine the first signal value based on a rate distortion analysis of the residual and the signal;
determine a second signal value based on a signal fitness of the residual, or determine the second signal value based on the rate distortion analysis of the residual and the signal;
compare the first signal value to the second signal value;
wherein the determining of whether to transmit the signal or the residual over the communication channel is based on the comparison of the first signal value to the second signal value;
determine whether to select a lossless path, the lossless path being when an element does not affect bitstream accuracy;
in response to selecting the lossless path, the first signal value is determined based on the signal fitness of the signal, and the second signal value is determined based on the signal fitness of the residual; and
in response to not selecting the lossless path, the first signal value is determined based on the rate distortion analysis of the residual and the signal, and the second signal value is determined based on the rate distortion analysis of the residual and the signal.

2. The apparatus of claim 1, wherein the instructions, when executed by the at least one processor, cause the apparatus at least to:
transmit the residual over the communication channel, in response to the second signal value being greater than the first signal value; and
transmit the signal over the communication channel, in response to the second signal value being less than or equal to the first signal value.

3. The apparatus of claim 1, wherein the rate distortion analysis comprises at least one of nonzero ratio, entropy, or cross-entropy.

4. The apparatus of claim 1, wherein the instructions, when executed by the at least one processor, cause the apparatus at least to:
determine, during the predictive coding of the signal, the approximation of the signal from a set of observed signals or previously estimated signals;
determine, during the predictive coding of the signal, a series of coefficients; and
determine whether to transmit the signal over the communication channel, to transmit the approximation over the communication channel, or to transmit the series of coefficients over the communication channel.

5. The apparatus of claim 4, wherein the instructions, when executed by the at least one processor, cause the apparatus at least to:
in response to determining to transmit the approximation over the communication channel, transmit also the coefficients over the communication channel.

6. The apparatus of claim 4, wherein the instructions, when executed by the at least one processor, cause the apparatus at least to:
transmit the series of coefficients over the communication channel, based on a rate distortion analysis.

7. The apparatus of claim 1, wherein the instructions, when executed by the at least one processor, cause the apparatus at least to:
determine, during the predictive coding of the signal, the approximation of the signal from a set of observed signals or previously estimated signals;
determine, during the predictive coding of the signal, a series of coefficients;
determine whether to transmit the signal over a communication channel, to transmit the approximation over the communication channel, or to transmit the series of coefficients over the communication channel; and in response to determining to transmit the approximation over the communication channel, transmit also the coefficients over the communication channel.

8. The apparatus of claim 1, wherein the residual is configured to be used to reconstruct the signal.

9. The apparatus of claim 1, wherein the residual is approximated using an estimator.

10. The apparatus of claim 1, wherein the instructions, when executed by the at least one processor, cause the apparatus at least to:
transmit, to a server, a weight update of a first neural network; and
receive, from the server, a weight update of a second neural network.

11. The apparatus of claim 1, wherein the instructions, when executed by the at least one processor, cause the apparatus at least to:
transmit, to a server, a last fully connected layer of a first neural network; and
receive, from the server, a last fully connected layer of a second neural network.

12. An apparatus comprising:
at least one processor; and
at least one memory storing instructions that, when executed by the at least one processor, cause the apparatus at least to:
receive a signal, the signal comprising a sparse signal;
determine a residual, the residual comprising a residual of the signal and a base signal or a residual of an approximation and the base signal, the approximation being an approximation of the signal;
determine a first signal value based on a signal fitness of the signal, or determine the first signal value based on a rate distortion analysis of the residual and the signal;
determine a second signal value based on a signal fitness of the residual, or determine the second signal value based on the rate distortion analysis of the residual and the signal;
compare the first signal value to the second signal value;
determine whether to transmit the signal or the residual over a communication channel, based on the comparison of the first signal value to the second signal value;
determine whether to select a lossless path, the lossless path being when an element does not affect bitstream accuracy;
in response to selecting the lossless path, the first signal value is determined based on the signal fitness of the signal, and the second signal value is determined based on the signal fitness of the residual; and
in response to not selecting the lossless path, the first signal value is determined based on the rate distortion analysis of the residual and the signal, and the second signal value is determined based on the rate distortion analysis of the residual and the signal.

13. The apparatus of claim 12, wherein the instructions, when executed by the at least one processor, cause the apparatus at least to:
transmit the residual over the communication channel, in response to the second signal value being greater than the first signal value; and
transmit the signal over the communication channel, in response to the second signal value being less than or equal to the first signal value.

14. The apparatus of claim 12, wherein the rate distortion analysis comprises at least one of nonzero ratio, entropy, or cross-entropy.

15. The apparatus of claim 12, wherein the instructions, when executed by the at least one processor, cause the apparatus at least to:
determine, during a predictive coding of the signal, the approximation of the signal from a set of observed signals or previously estimated signals;
determine, during the predictive coding of the signal, a series of coefficients; and
determine whether to transmit the signal over a communication channel, to transmit the approximation over the communication channel, or to transmit the series of coefficients over the communication channel.

16. The apparatus of claim 15, wherein the instructions, when executed by the at least one processor, cause the apparatus at least to:
in response to determining to transmit the approximation over the communication channel, transmit also the coefficients over the communication channel.

17. An apparatus comprising:
at least one processor; and
at least one memory storing instructions that, when executed by the at least one processor, cause the apparatus at least to:
receive a signal of data to be coded, the signal comprising a sparse signal;
determine, during a predictive coding of the signal, an approximation of the signal from a set of observed signals or previously estimated signals;
determine, during the predictive coding of the signal, a series of coefficients;
determine whether to transmit the signal over a communication channel, to transmit the approximation of the signal over the communication channel, or to transmit the series of coefficients over the communication channel;
in response to determining to transmit the approximation over the communication channel, transmit also the coefficients over the communication channel;
determine a residual, the residual comprising a residual of the signal and a base signal or a residual of the approximation of the signal and a base signal;
determine a first signal value based on a signal fitness of the signal, or determine the first signal value based on a rate distortion analysis of the residual and the signal;
determine a second signal value based on a signal fitness of the residual, or determine the second signal value based on the rate distortion analysis of the residual and the signal;
compare the first signal value to the second signal value;
determine whether to transmit the signal or the residual over a communication channel, based on the comparison of the first signal value to the second signal value;
determine whether to select a lossless path, the lossless path being when an element does not affect bitstream accuracy;
in response to selecting the lossless path, the first signal value is determined based on the signal fitness of the signal, and the second signal value is determined based on the signal fitness of the residual; and
in response to not selecting the lossless path, the first signal value is determined based on the rate distortion analysis of the residual and the signal, and the second signal value is determined based on the rate distortion analysis of the residual and the signal.

18. The apparatus of claim 17, wherein the instructions, when executed by the at least one processor, cause the apparatus at least to:

transmit the residual over the communication channel, in response to the second signal value being greater than the first signal value; and transmit the signal over the communication channel, in response to the second signal value being less than or equal to the first signal value.

19. The apparatus of claim 17, wherein the rate distortion analysis comprises at least one of nonzero ratio, entropy, or cross-entropy.

20. An apparatus comprising:

at least one processor; and at least one memory storing instructions that, when executed by the at least one processor, cause the apparatus at least to:

receive, over a communication channel, a residual, a signal, an approximation of the signal, or a series of coefficients obtained from a predictive coding of the signal;

wherein the residual comprises a residual of the signal and a base signal or a residual of an approximation and the base signal, the approximation being an approximation of the signal;

wherein the signal comprises a sparse signal;

in response to receiving the residual, reconstruct the signal from the base signal;

in response to receiving the approximation of the signal, reconstruct the signal from the approximation of the signal; and in response to receiving the series of coefficients, reconstruct the signal from the series of coefficients;

wherein whether the signal or the residual is received over the communication channel is based on a comparison of a first signal value and a second signal value;

wherein when a lossless path is selected, the first signal value is based on a signal fitness of the signal, and the second signal value is based on a signal fitness of the residual;

wherein when the lossless path is not selected, the first signal value is based on a rate distortion analysis of the residual and the signal, and the second signal value is based on a rate distortion analysis of the residual and the signal;

wherein the lossless path is when an element does not affect bitstream accuracy.

21. The apparatus of claim 20, wherein the instructions, when executed by the at least one processor, cause the apparatus at least to:

receive the residual, in response to a fitness of the residual being greater than a fitness of the signal; and receive the signal, in response to the fitness of the signal being equal to or greater than the fitness of the residual.

22. The apparatus of claim 20, wherein the instructions, when executed by the at least one processor, cause the apparatus at least to:

in response to receiving the approximation of the signal, receive also the series of coefficients obtained from the predictive coding of the signal.

\* \* \* \* \*